United States Patent [19]

DeVaney

[11] Patent Number: 5,548,816
[45] Date of Patent: Aug. 20, 1996

[54] METHOD AND SYSTEM FOR LOCATING MOBILE UNITS IN A CELLULAR TELEPHONE SYSTEM BY USE OF VIRTUAL LOCATION AREAS

[75] Inventor: David B. DeVaney, Longwood, Fla.

[73] Assignee: Astronet, Lake Mary, Fla.

[21] Appl. No.: 153,811

[22] Filed: Nov. 16, 1993

[51] Int. Cl.$^6$ ...................................... H04B 1/00
[52] U.S. Cl. .................. 455/53.1; 455/33.1; 455/54.1; 455/56.1; 379/59; 379/63
[58] Field of Search .................. 455/53.1, 33.1, 455/33.2, 33.3, 33.4, 34.1, 54.1, 54.2, 56.1; 379/59, 60, 63

[56] References Cited

U.S. PATENT DOCUMENTS

| | | | |
|---|---|---|---|
| 4,775,999 | 10/1988 | Williams | 379/59 |
| 4,876,738 | 10/1989 | Selby | 455/33 |
| 4,918,437 | 4/1990 | Jasinski et al. | 340/825.44 |
| 5,101,500 | 3/1992 | Marui | 455/33 |
| 5,150,362 | 9/1992 | Akerberg | 370/95 |
| 5,189,734 | 2/1993 | Bailey et al. | 455/33.2 |
| 5,212,822 | 5/1993 | Fukumine et al. | 455/33.1 |
| 5,305,466 | 4/1994 | Taketsugu | 455/33.1 |
| 5,361,396 | 11/1994 | Onoe et al. | 455/33.4 |
| 5,379,451 | 1/1995 | Nakagoshi et al. | 455/54.2 |
| 5,384,824 | 1/1995 | Alvesalo | 379/59 |
| 5,408,683 | 4/1995 | Ablay et al. | 455/33.1 |

*Primary Examiner*—Reinhard J. Eisenzopf
*Assistant Examiner*—Lee Nguyen
*Attorney, Agent, or Firm*—Leydig, Voit & Mayer, Ltd.

[57] ABSTRACT

A method and system for identifying the location of mobile units within a cellular telephone system. A subset of cells is dynamically assigned to a mobile unit based upon the cell location of the mobile unit at the time of registration. The mobile unit records the subset information, and as long as the mobile unit remains in one of the cells in the subset, it does not re-register its location with the system. The system is able to locate the mobile unit within the assigned subset of cells. When the mobile unit enters a new cell that is not within the subset of cells, it re-registers with the system which then assigns a new subset of cells corresponding to its location within a new cell that did not belong to the previous subset.

34 Claims, 18 Drawing Sheets

| MOBILE ID | VIRTUAL LOCATION DEFINED CELL — 16A |
|---|---|
| M20 | $C_7$ |

FIG. 7

| CELL # | CLI (LIST) — 16B |
|---|---|
| $C_1$ | 06, 07 |
| $C_2$ | 06, 07, 05, 02 |
| $C_3$ | 02, 06, 05, 01 |
| $C_4$ | 01, 02 |
| $C_5$ | 07, 06, 08, 09, 05 |
| $C_6$ | 05, 06, 07, 09, 03, 02 |
| $C_7$ | 02, 05, 03, 04, 01 |
| $C_8$ | 01, 02, 04 |
| $C_9$ | 08, 09, 07 |
| $C_{10}$ | 09, 07, 08, 10, 03, 05 |
| $C_{11}$ | 03, 05, 09, 10, 11, 04, 02 |
| $C_{12}$ | 04, 02, 03, 11, 01 |
| $C_{13}$ | 08, 10, 09 |
| $C_{14}$ | 10, 09, 08, 11, 03 |
| $C_{15}$ | 11, 03, 10, 04, |
| $C_{16}$ | 04, 11 |
| ● ● | ● ● |
| $C_{34}$ | 06, 07, 08, 22 |

FIG. 8

| CELL# | SI | CLI BROADCAST |
|---|---|---|
| $C_1$ | A | 06 |
| $C_2$ | A | 06 |
| $C_3$ | A | 02 |
| $C_4$ | A | 01 |
| $C_5$ | A | 07 |
| $C_6$ | A | 05 |
| $C_7$ | A | 02 |
| $C_8$ | A | 01 |
| $C_9$ | A | 08 |
| $C_{10}$ | A | 09 |
| $C_{11}$ | A | 03 |
| $C_{12}$ | A | 04 |
| $C_{13}$ | A | 08 |
| $C_{14}$ | A | 10 |
| $C_{15}$ | A | 11 |
| $C_{16}$ | A | 04 |
| ⋮ | | ⋮ |
| $C_{34}$ | A | 22 |

FIG. 9

| CLI | CELLS |
|---|---|
| 01 | $C_4, C_8$ |
| 02 | $C_3, C_7$ |
| 03 | $C_{11}$ |
| 04 | $C_{12}, C_{16}$ |
| 05 | $C_6$ |
| 06 | $C_2, C_1$ |
| 07 | $C_5$ |
| 08 | $C_9, C_{13}$ |
| 09 | $C_{10}$ |
| 10 | $C_{14}$ |
| 11 | $C_{15}$ |
| 12 | $C_{17}, C_{18}$ |
| 13 | $C_{19}, C_{20}$ |
| 14 | $C_{21}$ |
| 15 | $C_{22}, C_{23}$ |
| 16 | $C_{24}, C_{25}, C_{26}$ |
| 17 | $C_{27}$ |
| 18 | $C_{28}$ |
| 19 | $C_{30}, C_{31}$ |
| 20 | $C_{29}$ |
| 21 | $C_{32}, C_{33}$ |
| 22 | $C_{34}$ |

FIG. 10

| Standard 001 | |
|---|---|
| Cell# | VMLA Additional Cell List |
| $C_1$ | $C_2, C_5, C_9, C_{34}$ |
| $C_2$ | $C_1, C_5, C_6, C_3$ |
| $C_3$ | $C_2, C_4, C_6, C_7$ |
| $C_4$ | $C_3, C_6, C_7, C_8, C_{33}$ |
| $C_5$ | $C_1, C_2, C_6, C_9, C_{10}, C_{34}$ |
| $C_{31}$ | $C_{28}, C_{29}, C_{30}, C_{32}$ |
| $C_{32}$ | $C_8, C_{30}, C_{31}, C_{33}$ |
| $C_{33}$ | $C_4, C_8, C_{32}$ |
| $C_{34}$ | $C_1, C_2, C_5, C_9$ |

FIG. 14A

| Standard 002 | |
|---|---|
| Cell# | VMLA Additional Cell List |
| $C_1$ | $C_5, C_{10}, C_{14}, C_{18}$ |
| $C_2$ | $C_6, C_{11}, C_{15}, C_{19}$ |
| $C_3$ | $C_7, C_{12}, C_{16}, C_{20}$ |
| $C_4$ | $C_8, C_{30}, C_{28}, C_{27}$ |
| $C_5$ | $C_1, C_{10}, C_{14}, C_{18}$ |
| $C_{31}$ | $C_{29}, C_{32}, C_{33}$ |
| $C_{32}$ | $C_{29}, C_{31}, C_{33}$ |
| $C_{33}$ | $C_{32}, C_{31}, C_{29}$ |
| $C_{34}$ | $C_9, C_{13}, C_{17}, C_{21}$ |

FIG. 14B

METHOD AND SYSTEM FOR LOCATING MOBILE UNITS IN A CELLULAR TELEPHONE SYSTEM BY USE OF VIRTUAL LOCATION AREAS

FIELD OF THE INVENTION

The invention relates generally to mobile communication systems, and in particular to a system and method for locating mobile units within a cellular telephone system.

BACKGROUND OF THE INVENTION

In typical cellular radio telephone systems, the area served is divided into hexagonal cells wherein each cell is defined by a radio base station (RBS) having a plurality of transceivers for communicating both control and voice information with mobile units, i.e., mobile telephones. As long as a mobile unit is powered-up within the broadcast range of any RBS defining a cell of the system, the mobile unit is capable of initiating and receiving calls. A centralized mobile switching center (MSC) connected to all of the RBSs connects the mobile unit's outgoing and incoming calls to and from the public telephone network and to other mobile units.

When a mobile unit initiates a call in a system, it uses a control channel (i.e., a reserved carrier frequency) assigned to the RBS that defines the local cell in which it is currently located. When any two-way communication between the mobile unit and the RBS takes place on that particular control channel, the identity of the cell in which the mobile unit is currently located is known to the system. To handle voice communication, the system generally assigns a voice channel from a plurality of RBS transceivers available in the same cell that corresponds to the control channel.

While engaged in a call, the mobile unit often moves beyond the broadcast range of the current cell into the broadcast range of another cell. In this case, the system ordinarily transfers the mobile unit to a voice channel available in the new cell. Accordingly, while engaged in a call the system knows the current cell location of a mobile unit.

Even while not engaged in a call, an activated mobile unit receives information sent by the system on the control channel of the cell in which the mobile unit is currently located. When the mobile unit moves beyond the broadcast range of the current control channel, it is designed to search for and re-tune its receiver to the control channel of the cell serving the mobile unit's new location. However, as the mobile unit moves from one cell to another it typically does not transmit information to the new cell. The system therefore does not know the current cell location of a mobile unit that is neither engaged in a call nor in the process of initiating a call.

Accordingly, when an incoming call arrives at the MSC for a mobile unit, the MSC ordinarily does not know the current cell location of the mobile unit nor does it know the cell control channel to which the mobile unit is currently tuned. In order to determine the cell in which the mobile unit is currently located, the MSC sends control information addressed to that mobile unit on the control channel of every cell in which the mobile unit could possibly be located. When the mobile unit recognizes its address on the control channel to which it is currently tuned, it responds to the system on the control channel of that cell and thereby notifies the system of the cell that is currently serving the mobile unit. In other words, the MSC pages the cells of the system until the mobile unit is located.

Although locating a mobile unit by sending information to the mobile unit on the control channel of every cell is an acceptable procedure in systems serving a small number of mobile units, this procedure becomes very inefficient as the number of mobile units increases and the number of cells increases to serve larger geographic areas or to provide more call capacity. At some point, the capacity of the control channels becomes exhausted due to a large portion of that capacity being used in an attempt to locate mobile units, even though each mobile unit is only present within one of the many cells of the system at any given time.

To overcome this capacity problem, current systems employ several techniques to attempt to reduce the number of cells into which this redundant information must be sent. These methods are all directed to methods of determining the probable location of the mobile unit within a subset of all possible cells by having the mobile unit report its location even if it does not need to communicate with the system for other purposes such as originating a call. By way of example, two such methods include 1) periodic or time-based notification, and 2) location-based notification. In addition, both of these methods may be combined with notification (of the mobile unit's presence in the system) on power-up and power-down of the mobile unit to reduce attempts to locate mobile units that are not currently powered-up in any cell of the system.

In the time-based notification method, the system sends information on the control channel of each cell indicating when one or more of the mobile units should notify the system of their location. The system can then determine the probable location of a mobile unit based on the time and location of the last report and the anticipated rate of movement. This method is particularly effective in systems covering very large areas with large cells. However, when the cells are relatively small or the rate of movement is relatively fast, the time interval between reports must be shortened to accommodate the frequent cell location changes. As a result, the proportion of location reports to incoming calls increases, thereby burdening the system with frequent, unnecessary reports which tend to overload the available control channels. This method also burdens the system with periodic reports from mobile units that have not changed their location.

In the location-based reporting method, cell identification information is sent by each cell on its control channel. The mobile unit reports its location whenever it moves to a cell control channel that is sending different cell location identification information. One well-known type of cell identification occurs when a mobile unit moves from one cellular system to a different system, and the mobile unit receives the system change information and reports its location to the new system.

One technique for location-based reporting within the same system includes transmitting location information common to a fixed group of cells, i.e., to a subset of the total number of cells grouped into fixed location areas. Typically, the cells are geographically organized into groups of cells having fixed grouping boundaries. In this case, each fixed group of cells typically transmits the same group location identification to mobile units therein. When a mobile unit moves from one group location to another, it reports its new group location to the system. With this method mobile units report their location only when and if they move from the previously reported group location, thereby eliminating unnecessary location reports and allowing the system to know the mobile unit's location to within a fixed group of cells.

The number of fixed location areas, and the number of cells in each location area can be adjusted to balance the overhead of registrations (caused by the mobile unit's movement and resultant reporting) against the overhead of paging multiple cells of the group. In other words, as a fixed group increases in the number of cells that comprise it, the greater the amount of paging required to find the mobile unit within its current group, while as a fixed group decreases in the number of cells that comprise it, the greater the amount of location reporting resulting from more numerous and frequent crossings of the fixed boundaries.

While this system is often able to reduce the system overhead by reducing the total amount of paging in exchange for location reporting, problems arise since the location areas are defined by a set of cells sending common location identification to all mobile units receiving the control channels of these cells.

By way of example, when two adjacent cells in different fixed location areas are sending different location identification information across a fixed boundary, the mobile unit will report its location each time it moves from one cell to the other. Since a mobile unit may repeatedly move between cells in a short period of time, the number of location reports will be excessive. In addition, such numerous registrations tend to quickly drain the batteries on certain types of mobile units (for example, hand-held mobile units with a self-contained power source as opposed to mobile units powered by car batteries) since signal transmission ordinarily consumes more power than does signal reception.

Moreover, substantial problems can arise when the mobile unit travels across boundaries of different systems. Essentially, different adjacent systems are somewhat analogous to fixed location areas in that the mobile unit must report its location to the new system upon entry in order to be found by the MSC that receives its incoming calls.

For example, when a mobile unit changes systems, such as when moving from a "home" system to a "foreign" system, the foreign system may be arranged to report the presence of the mobile unit therein to the home system. In this manner, the home system is able to forward incoming calls to the foreign system. However, there is often a time delay between the time that the mobile unit actually enters the foreign system and the time that the home system receives notification of the mobile unit's presence therein. If the mobile subsequently reenters a cell in the home system during this time delay, i.e., prior to the home system receiving the notification, it re-registers its presence with the home system. When the home system later receives the notification from the foreign system, the home system concludes that the mobile unit has moved into a cell of the foreign system when in actuality it has just returned. In essence, under these circumstances the location reports are received out of sequence, thereby resulting in the recording of incorrect location information. This results in the mobile unit being "lost" to the home system until a subsequent location registration takes place.

SUMMARY OF THE INVENTION

Accordingly, it is a primary object of the invention to provide a method and system for reducing system overhead while balancing the amount of paging against the number of registrations.

It is another object of the present invention to provide a method and system as characterized above to locate mobile units within a virtual subset of cells that varies dynamically.

Another related object of the invention is to provide a method and system of the above kind wherein each mobile unit has its own virtual location.

It is another object to provide a method and system of the above kind wherein the system realigns the subset of cells corresponding to each cell to optimize system needs.

Still another object is to provide such a method and system wherein the virtual subset groupings are broadcast to the mobile units.

Another object is to provide such a method and system wherein the virtual subset groupings are standardized within the mobile units.

It is yet another object of the invention to provide a method and system that facilitates location reporting as mobiles travel between different systems.

It is another object of the invention to minimize the coordination required between different systems of cells when locating mobile units in one of the systems.

Briefly, the invention provides a method and system for locating a mobile unit within a dynamic subset of all of the cells of the system. To this end, information identifying the cell is transmitted from each of the cells in the system, and is received at the mobile unit from a local one of the cells that is the cell within which the mobile unit is located. A transceiver at each RBS is employed to transmit the cell identifying information to a transceiver at the mobile unit.

The received cell identity is then compared with the identity of a subset of all of the cells stored in a memory to determine if the identity of the local cell matches the identity of one of the cells in the subset. If there is not a match, the mobile unit registers its location by transmitting information from the mobile unit to the RBS of the local cell to identify and report the presence of the mobile unit within the local cell. The RBS then communicates information to the MSC that locates the mobile unit within the local cell and within the new subset of cells. The identity of the subset of cells stored in the memory is updated with the identities of the cells of a new subset that includes the local cell. A processor is preferably employed to compare the identities of the subset of cells in the memory with the identity of the local cell, and circuitry responsive to the processor informs the RBS of the local cell that the mobile unit is within the cell and also updates the identities of the cells in the subset of cells stored in the memory. The subset is alternatively known as a virtual mobile location area, or the acronym VMLA.

Other objects and advantages will become apparent from the following detailed description when taken in conjunction with the drawings, in which:

BRIEF DESCRIPTION OF THE DRAWINGS

FIG. 7 is a representation of an MSC memory area reserved for storing the last reported location of a mobile unit in a cell of the system;

FIG. 8 is a representation of an MSC memory area reserved for storing the subset information corresponding to each cell of the system;

FIG. 9 is a table of the cell location identification (CLI) codes and system identification (SI) codes broadcast by the RBSs defining the cells of the system to mobile units therein;

FIG. 10 is a table of the CLI codes and their corresponding cell identities;

FIGS. 14a–14c are representations of the memory contents reserved for recording standardized subset information.

Figure 1:
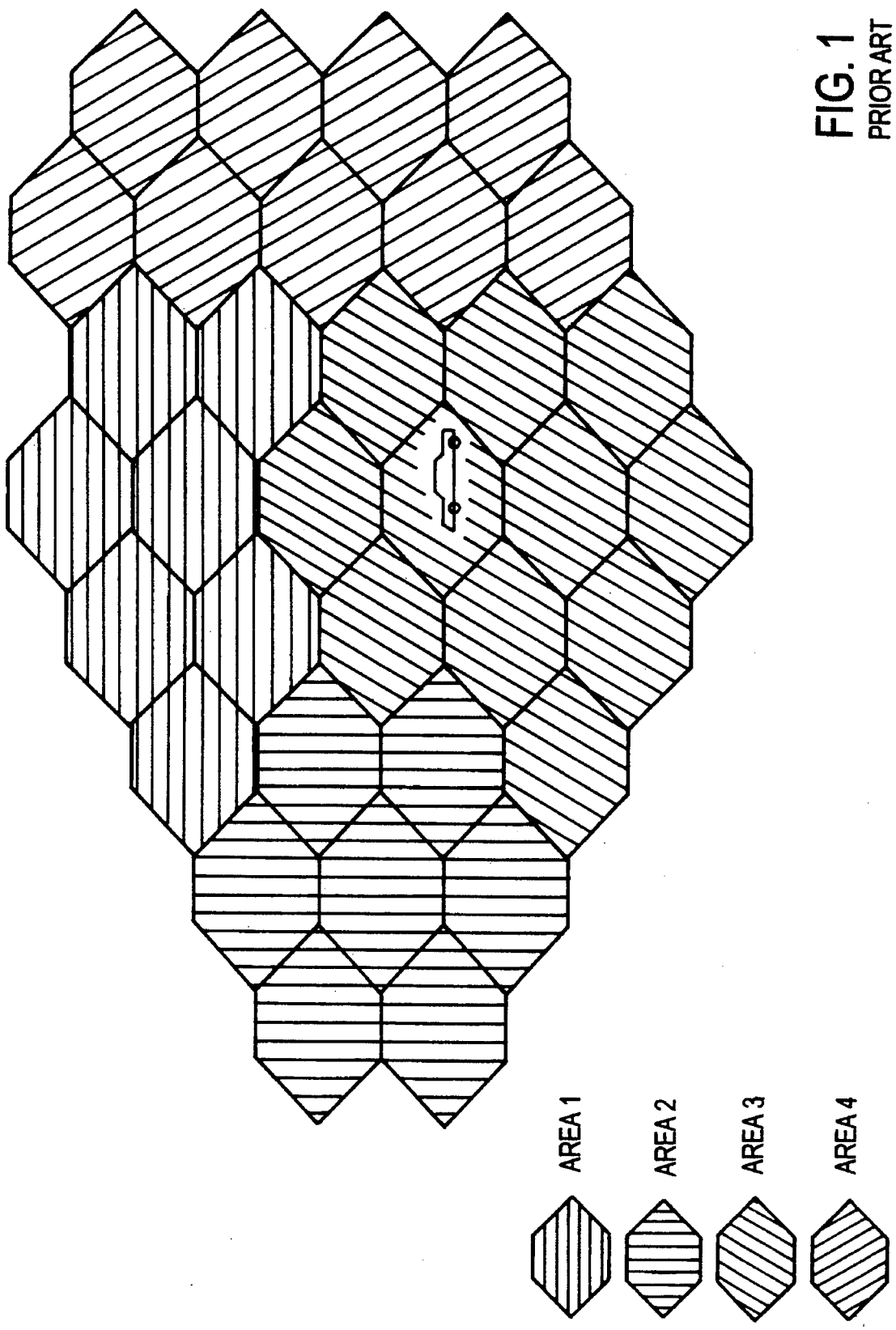
FIG. 1 illustrates a prior art cellular system wherein subsets of cells are grouped into fixed location areas.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE PREFERRED EMBODIMENT

Figure 2:
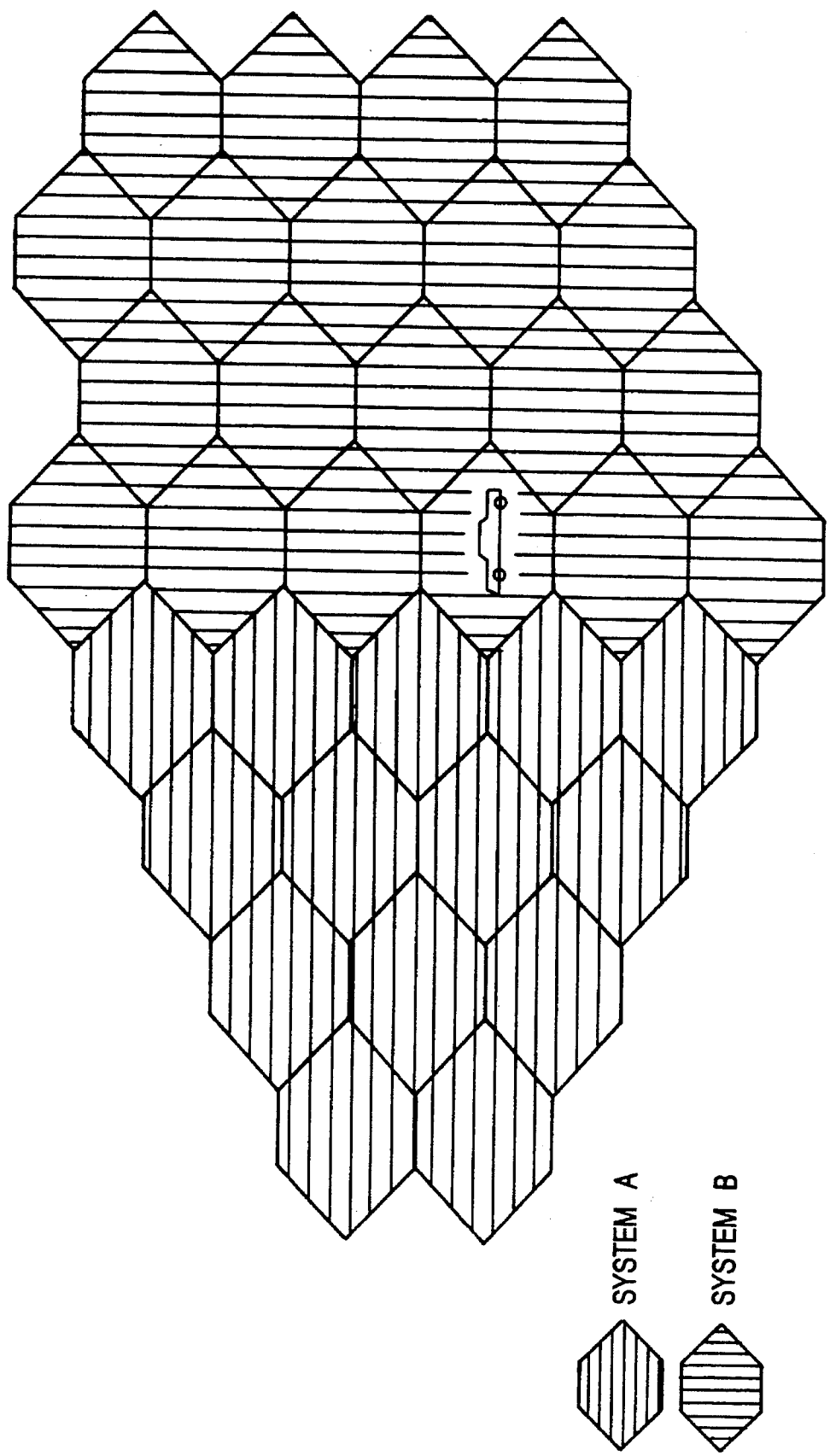
FIG. 2 illustrates two adjacent cellular systems.

FIGS. 1 and 2 show two systems wherein the cells are subdivided into fixed location groupings. FIG. 1 represents the prior art of dividing groups of cells into fixed location areas within a single cellular system, while FIG. 2 illustrates two different, but adjacent systems having a fixed boundary therebetween. In the fixed location areas of FIG. 1 and the adjacent systems illustrated in FIG. 2, as mobile units travel across these fixed boundary lines, the previously described problems associated therewith (i.e., excessive location reporting, location reports received out-of-sequence, and so on) adversely affect mobile communications.

Figure 3A:
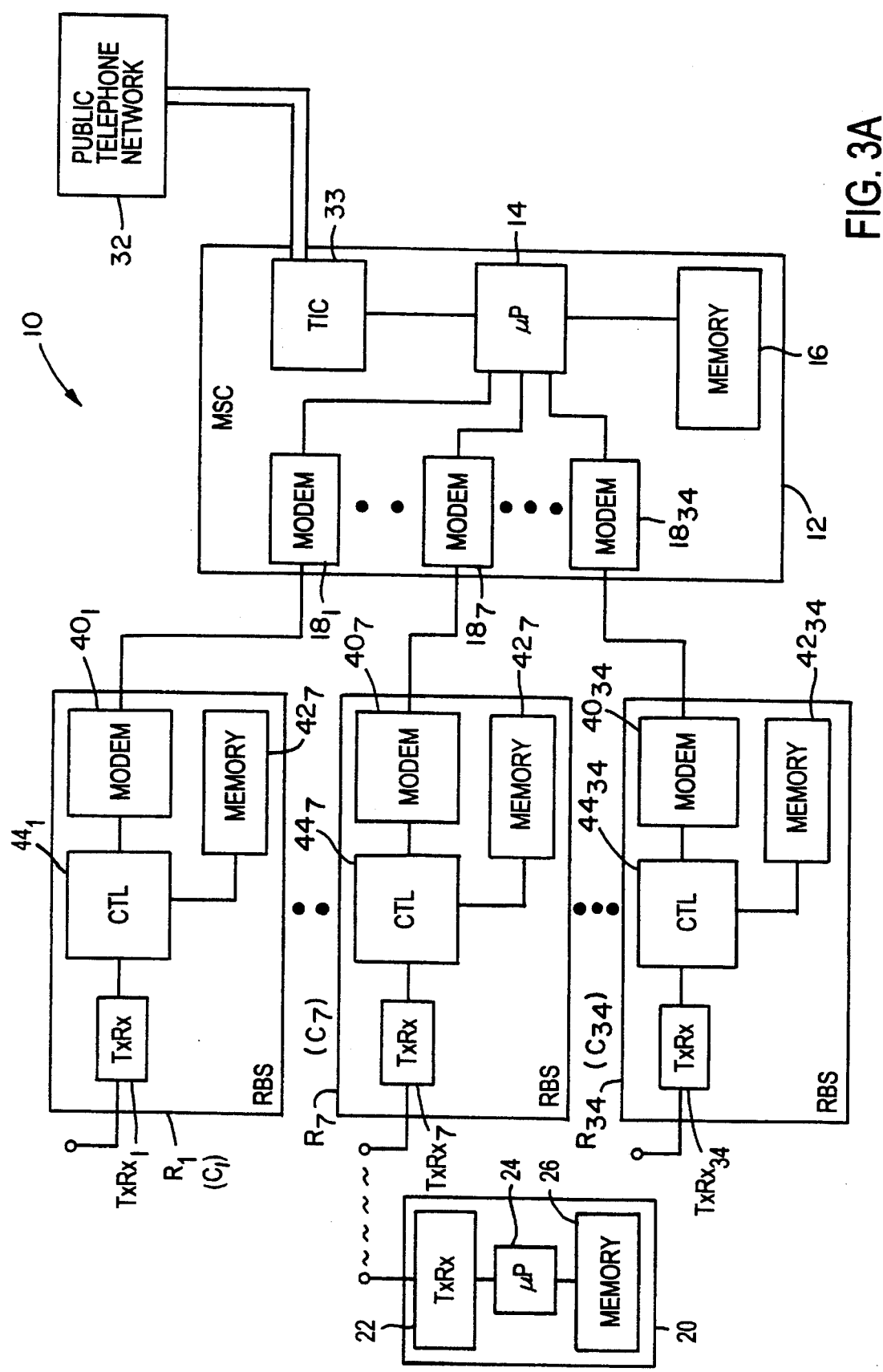
FIG. 3a is a block diagram illustrating the key components of the cellular system according to the invention.
Figure 3B:
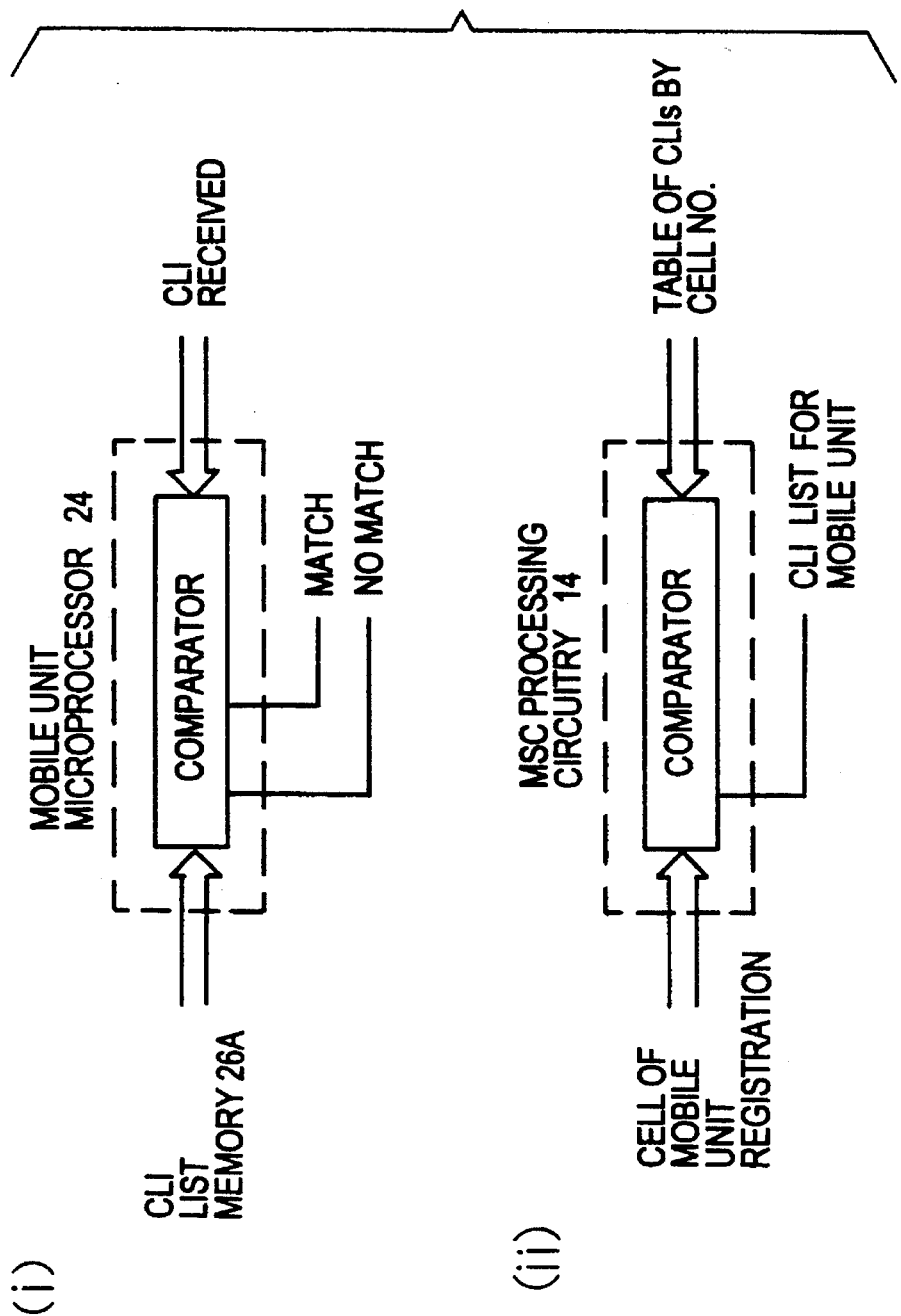
FIG. 3b is a pair of state machine diagrams (i) and (ii) representing functions performed by the mobile unit and MSC processing circuitry of FIG. 3a in accordance with received and stored data.
Figure 4:
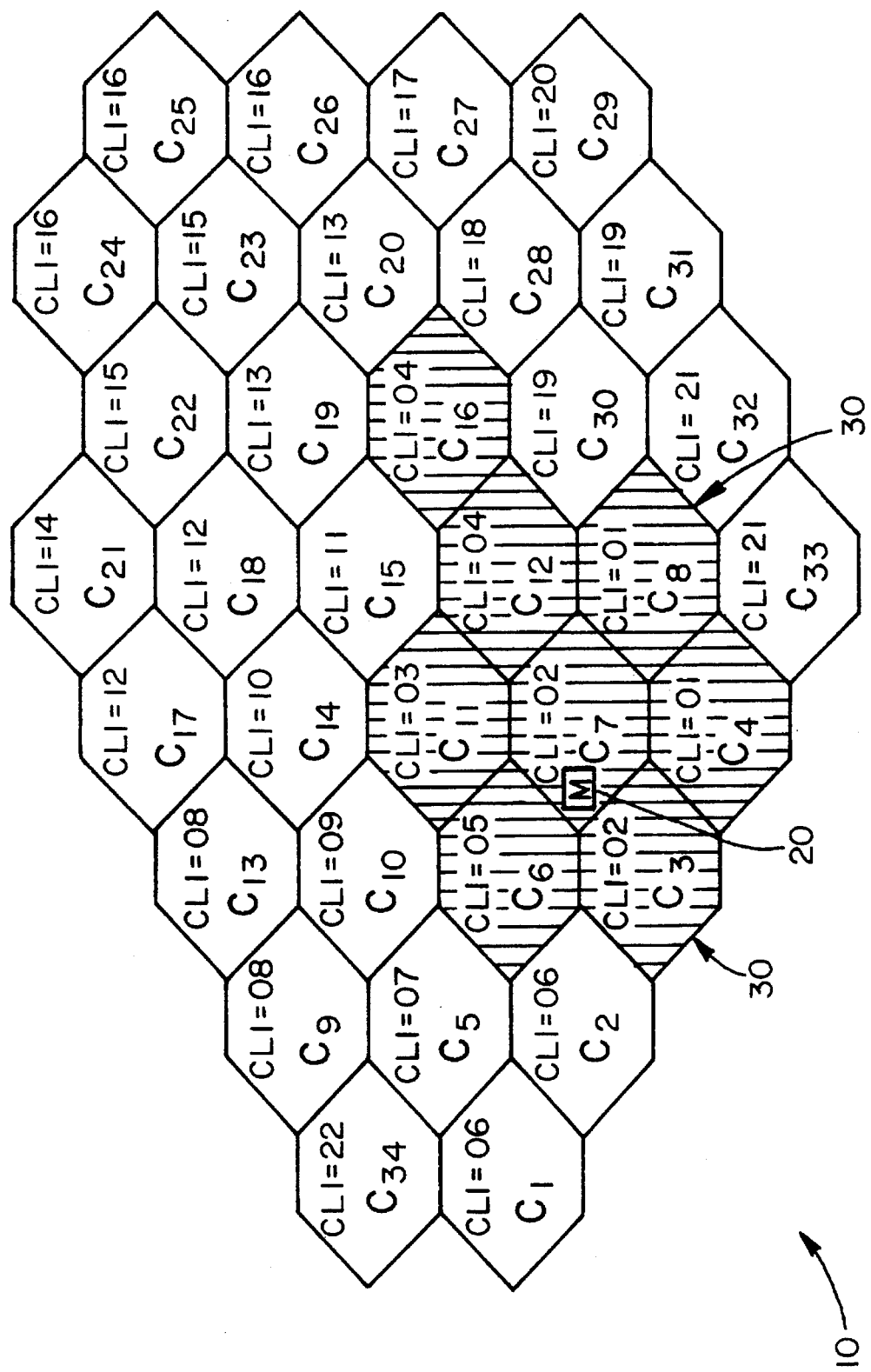
FIG. 4 is a representation of a cellular system according to the invention wherein a subset of cells is dynamically assigned to a mobile unit and recorded as its virtual location area.

Turning now to FIGS. 3a–4, there is shown a cellular telephone system according to the invention generally designated 10 having a plurality of cells $C_1$–$C_{34}$, corresponding to radio base stations (RBSs) $R_1$–$R_{34}$ connected to a mobile switching center (MSC) 12. It is to be understood that conventional input–output circuitry allowing both voice and data communication between the MSC 12 and each RBS $R_1$–$R_{34}$ defining a cell $C_1$–$C_{34}$ are present. Moreover, it can be readily appreciated that the system of cells may be of any number and be arranged in any desired pattern, and is in no way intended to be limited to the thirty-four cells as illustrated.

As in conventional systems, the mobile unit 20 has a transceiver (TxRx) 22 for communicating with at least one transceiver (TxRx) such as transceiver $TxRx_7$ of the RBS $R_7$ (corresponding to cell $C_7$) on a reserved control channel and an assigned voice channel when appropriate. Additionally, the mobile unit 20 comprises conventional circuitry including a processor 24 and memory 26. The MSC 12 also has processing circuitry such as microprocessor 14 and at least one memory storage area 16 associated therewith. The MSC 12 and the RBSs $R_1$–$R_{34}$ transfer control data between MSC modems $18_1$–$18_{34}$ and RBS modems $40_1$–$40_{34}$. To control the operation of the RBSs, conventional system controllers (CTLs) $44_1$–$44_{34}$, which may be microprocessors or the like, and memories $42_1$–$42_{34}$ are ordinarily incorporated therein.

In accordance with one aspect of the invention, any time that a mobile unit (such as the mobile unit 20) is actively receiving signals from any RBS in the system, the mobile unit 20 occupies a virtual location area associated with its current cell. As best shown in FIG. 4, the mobile unit 20 is currently within cell $C_7$. The virtual location area 30 (indicated by cross-hatching) comprises a subset group of cells defined for the current cell $C_7$ that the mobile unit is within at the time of registration with the system.

Like cell $C_7$, every other cell of the system may have a subset group of cells previously assigned to it (preferably by the MSC 12) so that whenever a mobile unit registers its presence within a particular cell, the MSC 12 is able to access its memory 16 to determine the identities of the other cells in that particular cell's subset group. When a call is received, the MSC 12 only needs to page the cells of the subset group to locate the mobile station. Thus, in the illustrated embodiment, as described in more detail below, once registered with the cell $C_7$, the MSC 12 at most only needs to page cells $C_3$, $C_4$, $C_6$, $C_7$, $C_8$, $C_{11}$, $C_{12}$ and $C_{16}$ to locate the mobile unit 20. This paging of the subset cells may either be done simultaneously or sequentially until the mobile unit 20 is located.

In accordance with one feature of the invention, to facilitate the paging of the cells, each cell $C_1$–$C_{34}$ is provided by the MSC 12 with a cell location identifying label (CLI) that may or may not be unique to each cell. As a result of this feature, the amount of information that must be transmitted from an RBS to the mobile unit is reduced, since rather than broadcasting an identifier for (i.e., the identity of) each individual cell in the subset, one or more cells may be assigned the same identifying CLI code. As best shown in FIGS. 4, 9 and 10, cells $C_1$ and $C_2$ have commonly been assigned a CLI equal to 06, cells $C_3$ and $C_7$ have commonly been assigned a CLI equal to 02, and so on. As can be readily appreciated, unless reorganized at a later time by the MSC 12, cells $C_1$ and $C_2$ will always be paired together whenever these cells belong to a subset group of cells for a particular mobile unit since their CLIs are identical. Note that cell $C_6$ has been singularly assigned a CLI equal to 05.

Thus, although not necessary to the invention since the individual cell numbers can alternatively be transmitted as the identity of the cell, this CLI coding feature reduces the amount of subset information that must be transmitted to a mobile unit when it registers in a new cell, as more than one cell in the subset can be identified with a single code number (i.e., the CLI). It can also be appreciated that this feature only adds to the flexibility of the system, since the MSC 12 can always assign each individual cell to a unique CLI if necessary, (although this will correspondingly increase the amount of information that must be transmitted as described previously).

Figure 5:
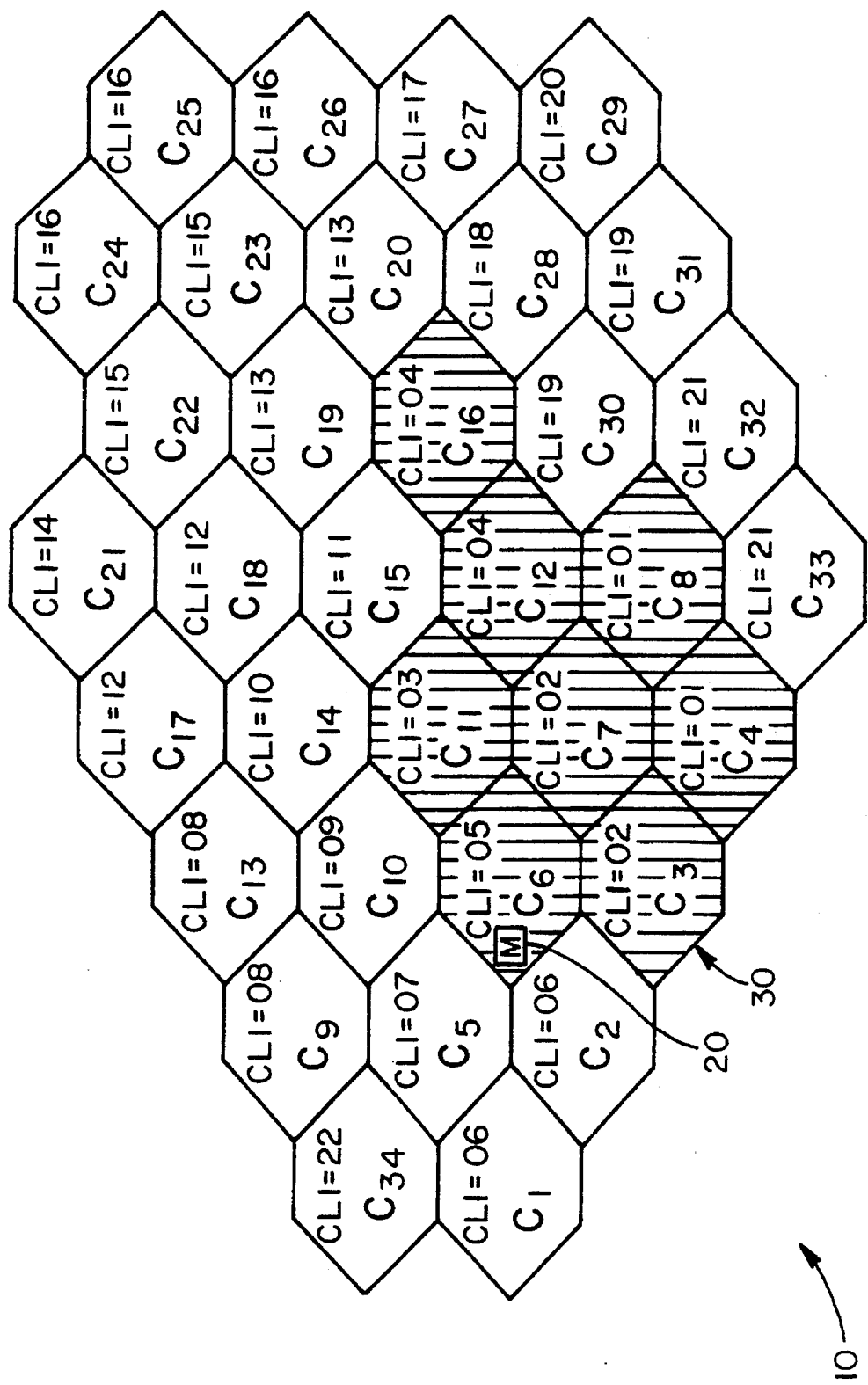
FIG. 5 is a representation of a cellular system according to the invention wherein a mobile unit has traveled to a different cell within the subset of cells assigned in FIG. 4.
Figure 6:
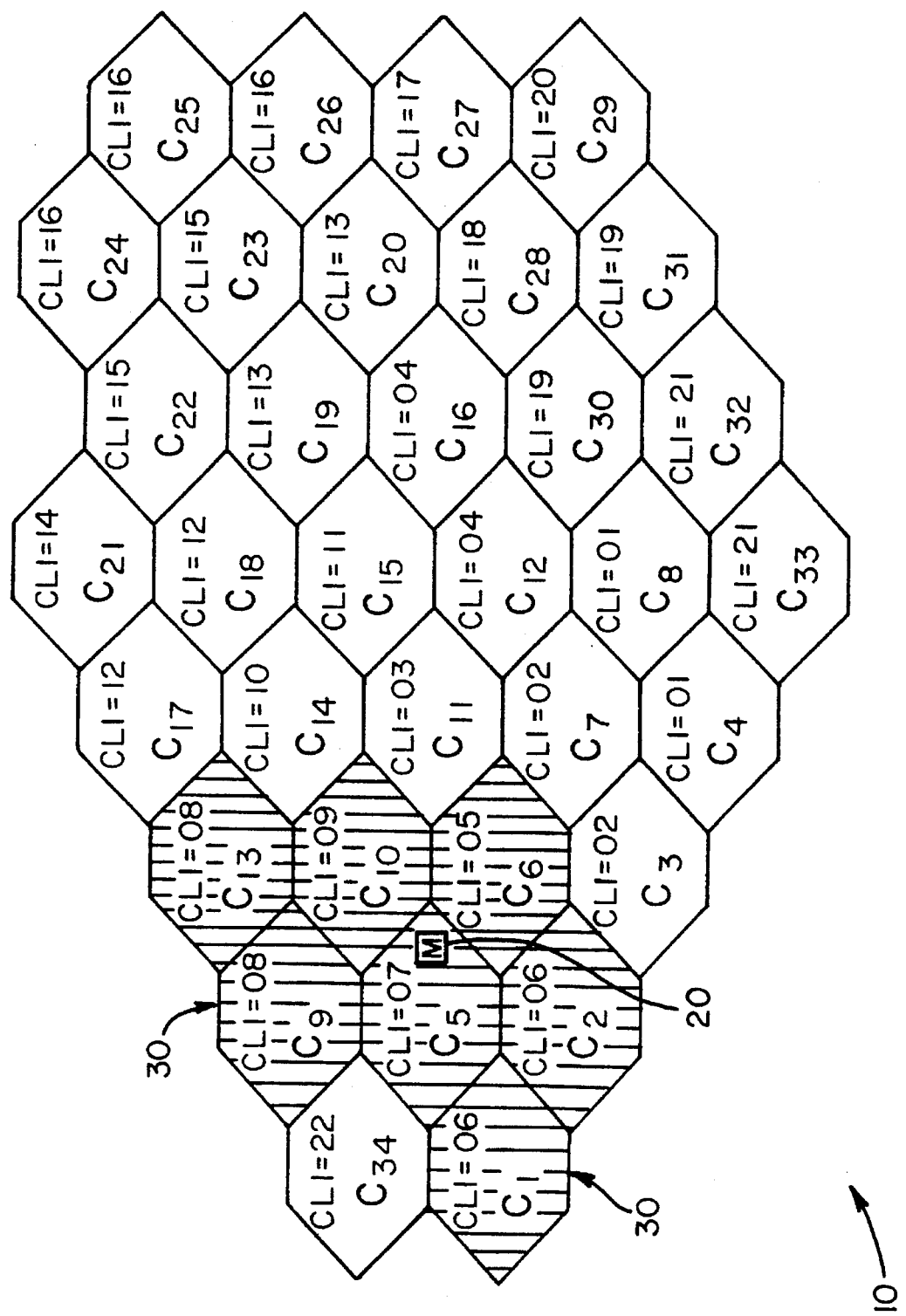
FIG. 6 is a representation of a cellular system according to the invention wherein a mobile unit has traveled to a different cell out of the subset of cells assigned in FIG. 4 and is assigned a new subset of cells as its virtual location area.

To facilitate the understanding of the invention, the operation of the system will now be described with primary reference to FIGS. 4–6 wherein a single mobile unit initially becomes operational in cell $C_7$ (FIG. 4), travels to cell $C_6$ (FIG. 5) and thereafter enters cell $C_5$ (FIG. 6).

Figure 11:
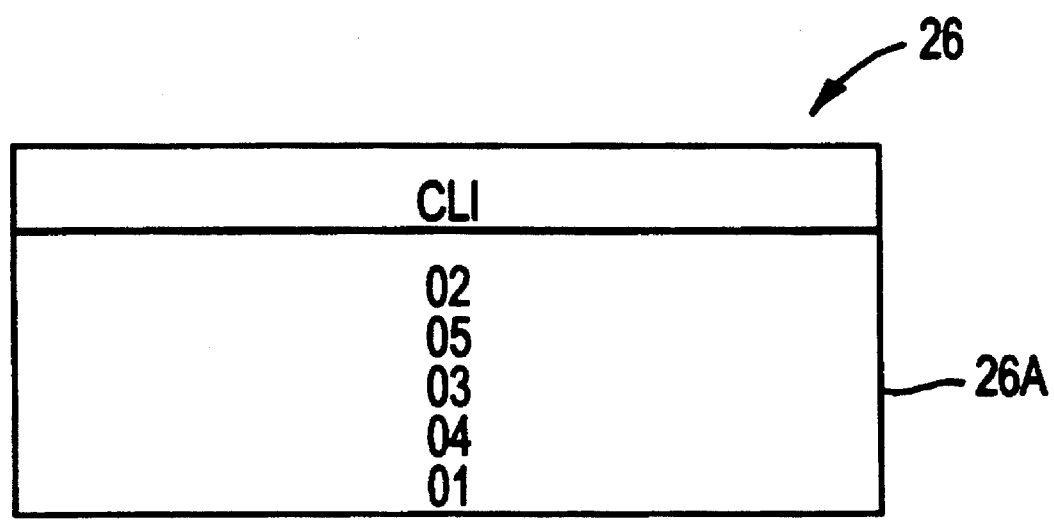
FIG. 11 is a representation of the contents of a section of mobile unit memory reserved for recording virtual location subset information.
Figure 12:
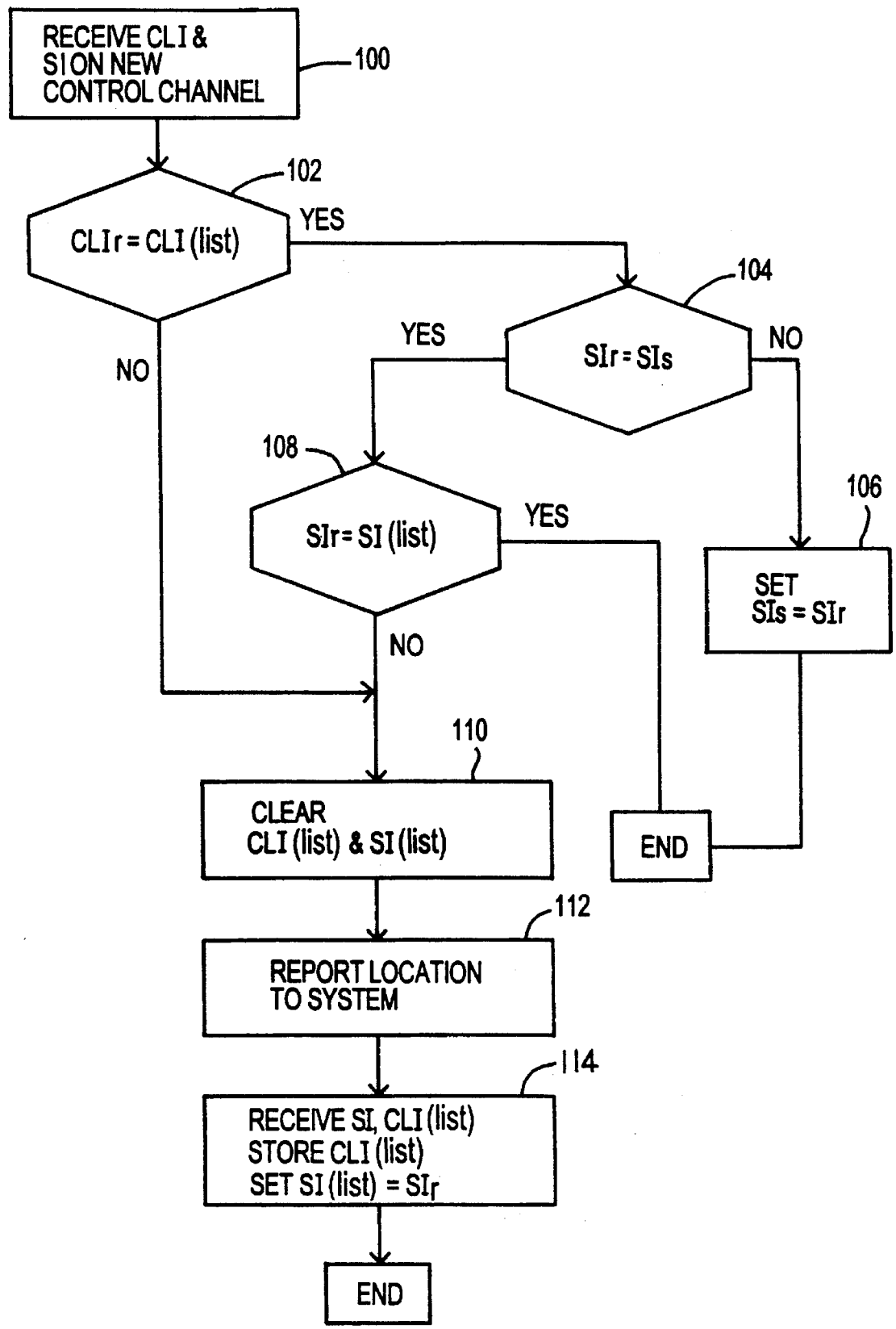
FIG. 12 is a flow diagram of the mobile unit software functions for implementing the invention.

As shown in the exemplified embodiment of the FIGS. 3a–11 and the flowchart FIG. 12, the system functions as a mobile station 20 becomes active in a cell (such as the cell $C_7$) of the system, for example by being powered-up by a subscriber in that cell. At the time of power-up, the section 26a of the mobile unit memory 26 (see FIG. 11) that is reserved for storing subset information is cleared, either by action taken during the power-up procedure itself or because the memory is cleared as a result of the previous powering-down of the unit 20. Of course, it can be readily appreciated that at the time of powering-up, as part of its power-up procedure the mobile unit 20 can immediately register itself to the current cell $C_7$ of the system that it is within, however it can also initially register with the system by acting in accordance with the invention as described below.

As shown in the flowchart of FIG. 12, at step 100 the mobile unit 20 regularly receives (on the control channel of the RBS $R_7$ corresponding to cell $C_7$) the CLI number assigned to cell $C_7$, a CLI equal to "02" and a system identifier (SI), an "A" code (see FIG. 9). The mobile unit 20 ordinarily takes no action unless a cell change has been detected (i.e., either during power-up or when the mobile re-tunes its transceiver to a new control channel). When a change in cells is detected, as indicated at step 102 of FIG. 12 and as represented by the state machine in part (i) of FIG. 3b, the mobile unit processor compares the received CLI ($CLI_{(r)}$=02) with the contents ($CLI_{(list)}$) of its subset cell storage area in the memory 26a. The comparison determines if the new cell has an identifier matching a cell identifier in the previously assigned subset group that was received when the mobile unit registered in the cell $C_7$, i.e., if $CLI_{(r)}$ equals a CLI stored in $CLI_{(list)}$. Since the memory 26a is initially clear (not shown), no match is found at step 102 and as a result the mobile unit 20 clears its memory section 26a (which initially is already clear) at step 110 and reports its location to the system by transmitting information to the RBS $R_7$ of cell $C_7$ at step 112. At this point, at step 114 the mobile unit 20 receives and stores in the memory 26a the new CLI list for the subset of cells grouped with current cell $C_7$ (FIG. 11). In this example, the CLI list consists of CLI numbers 02 (for cells $C_3$ and $C_7$), 05 (for cell $C_6$), 03 (for cell $C_{11}$), 04 (for cells $C_{12}$ and $C_{16}$) and 01 (for cells $C_4$ and $C_8$), i.e., $CLI_{(list)}$=02, 05, 03, 04 and 01. FIG. 10 shows the CLI numbers and their corresponding cells for the exemplified embodiment.

Figure 13:
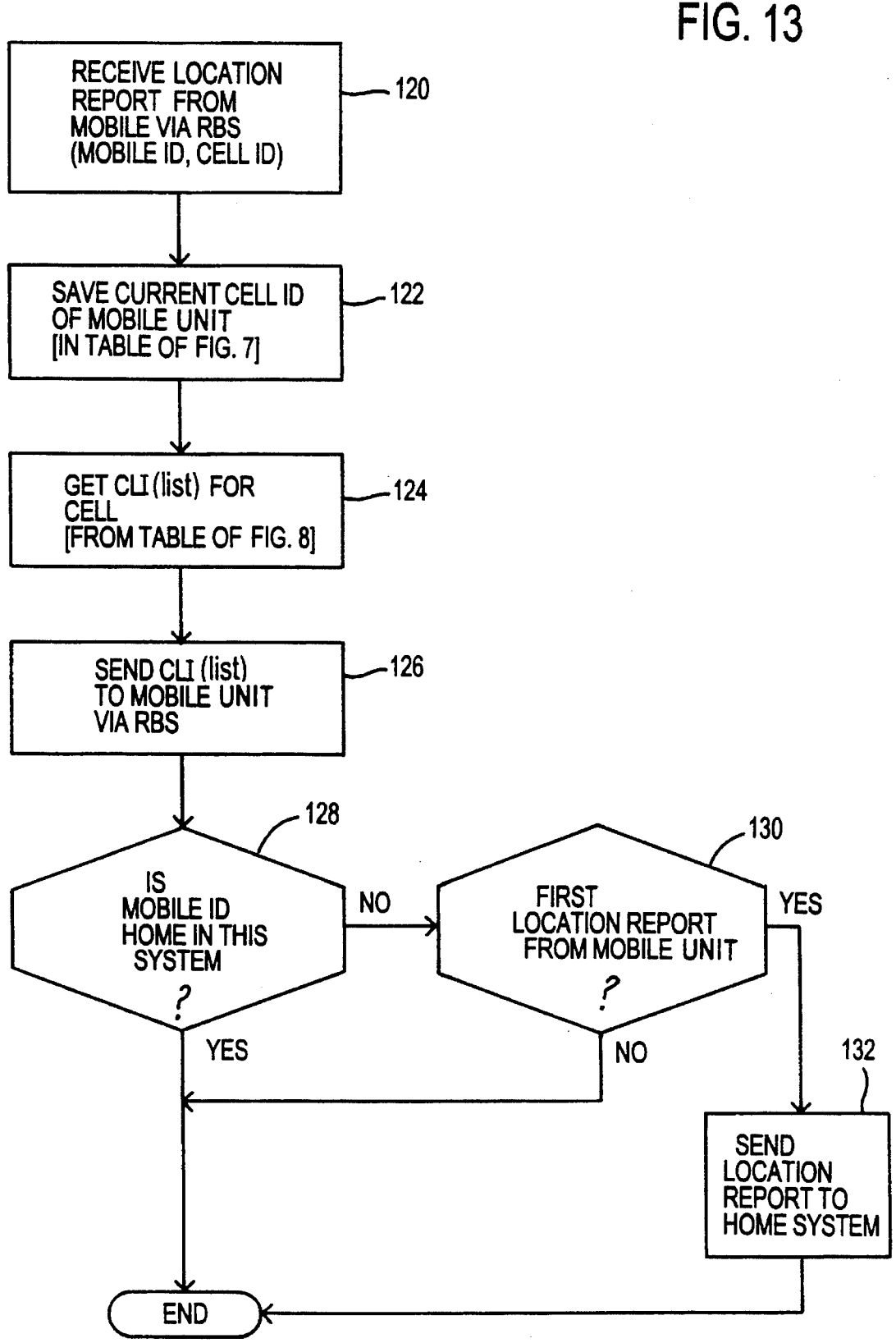
FIG. 13 is a flow diagram of the MSC software functions for implementing the invention.

As shown in FIG. 7 and in steps 120 and 122 of FIG. 13, the MSC 12 receives from the RBS $R_7$ and records in an MSC memory area 16a the identity of the mobile unit 20 (equal to M20) in conjunction with the present cell (equal to $C_7$) that the mobile unit 20 is within. In a further MSC memory area 16b (FIG. 8), the MSC 12 has previously recorded the subset information for each cell by storing the CLI list for each cell. Thus, as shown, in MSC memory area 16b, cell $C_7$ has as its corresponding virtual memory location area cells having CLI numbers 02, 05, 03, 04 and 01 as also indicated by the subset of cells of FIG. 4. The list is equivalent to the list stored in the mobile unit memory section 26a as described above.

At steps 124 and 126, the MSC retrieves the CLI list for cell $C_7$ and sends it through the RBS $R_7$ to the mobile unit 20. The retrieval step may be accomplished as represented in the state machine diagram of part (ii) of FIG. 3b by comparing the cell identity $C_7$ with a list of cells in memory to find the memory location of the appropriate CLI list or by otherwise indexing the memory using cell $C_7$. Of course, it can be readily appreciated that rather than retrieve and transmit the list for each registration, to reduce data transmission the MSC 12 may have previously downloaded the appropriate CLI list to each RBS $R_1$–$R_{34}$ of the system which records it in its memory $42_1$–$42_{34}$. It can also be appreciated that if the MSC needs to realign or update the cell groupings, a subsequent and similar downloading procedure is then executed. Further, it should be understood that the CLI list may be different for different mobiles as described below, (for example based on subscription type), and therefore with an MSC to RBS downloading procedure the RBS may have to select from among multiple lists, either by its making its own determination or by direction from the MSC. In any case, the RBS transfers the proper CLI list to the mobile unit.

After receiving the CLI subset list for cell $C_7$, the mobile unit 20 returns to step 100 and either waits until a new cell is entered or alternatively continues to execute the steps symbolized in FIG. 12 while remaining within the cell $C_7$. However, unlike the time of the initial comparison when the mobile unit memory area 26a was cleared, the subsequent time that the mobile unit 20 receives a CLI equal to "02" at step 100, the mobile unit will find a match at step 102 since a "02" is stored in the memory area 26a. Accordingly, the procedure then branches to a different routine in order to compare the current system identifier ($SI_s$) with the received system identifier ($SI_r$) to ensure that the mobile has not moved into a cell of another system that happens to have a CLI number matching the stored list. The system comparisons are described in more detail below, however for now it is sufficient to recall that since the mobile unit is still in the same cell $C_7$, the mobile cannot have entered into a new system of cells, and thus no subsequent registration occurs.

As shown in FIG. 5, as the mobile unit 20 travels to a new cell $C_6$, again at step 100 it begins to receive cell $C_6$'s CLI code equal to "05" along with an SI code "A" (see FIG. 9). Since it has entered a new cell, at step 102, it compares the "05" with the CLI list in its reserved memory area 26a. Since cell $C_6$ is in the virtual location area defined for cell $C_7$, the CLI number received matches one on the stored CLI list, so by agreed standard procedure the mobile unit 20 does not register its presence with the new cell $C_6$. Note that the received SI code is still the same "A" code. As shown in FIGS. 4 and 5, for mobile unit 20, as presently assigned cell $C_6$ is indeed in the same virtual location area originally defined for cell $C_7$. At this time, the MSC 12 is aware of the mobile unit 20's general location within the cells of the subset group originally based on cell $C_7$ and can therefore locate the mobile unit to connect it to an incoming call, for example a call coming from the public telephone network 32 through a telephone interface circuit (TIC) 33, by only paging the few cells of the virtual group, including cell $C_6$. Once located, connection is made through the proper RBS in the usual manner.

In keeping with the invention, the mobile unit 20 can travel back and forth between cells $C_6$ and $C_7$ any number of times without having to re-register its location with the system. Likewise, the mobile unit 20 can travel to any of cells $C_{11}$, $C_3$, $C_4$, $C_8$, $C_{12}$ and $C_{16}$ without re-registering. In short, only when the mobile unit 20 leaves its virtual location area (the subset group of cells) and enters a new cell that does not belong to the previous subset group is any action required.

Thus, as shown in FIG. 6, when the mobile unit 20 travels to cell $C_5$, it leaves the virtual location area originally associated with cell $C_7$, and at step 102 no CLI match is found since cell $C_5$ is broadcasting a CLI equal to 10 which is not on the $CLI_{(list)}$ stored in the mobile unit's memory area 26a. Accordingly, at this time at step 112 the mobile unit 20 registers with RBS $R_5$ its presence within cell $C_5$ and receives a new list of CLI numbers associated with that cell, i.e., CLI=07 (for current cell $C_5$), CLI=05 (for cell $C_6$), CLI=06 (for cells $C_1$ and $C_2$), CLI=08 (for cells $C_9$ and $C_{13}$), and CLI=09 for cell $C_{10}$).

At that time, a new virtual location area is defined for the mobile unit 20, such as the location area depicted in FIG. 6. Note that in accordance with the invention, unlike fixed location areas, the mobile unit in the same system cannot ordinarily repeatedly cross a boundary into a cell that is not on its list, requiring registration each time, since once the mobile unit 20 enters an unlisted cell both the current cell and the previous cell typically become part of its new list. For example, even if the mobile unit 20 immediately reenters the cell $C_6$ after previously crossing the boundary into the cell $C_5$, no additional registration takes place. That is because as allocated in this example, cell $C_6$ belongs to the virtual location area for cell $C_7$ and also to the virtual location area for cell $C_5$.

In accordance with another feature of the invention, since different systems of cells (having their own MSC) are often adjacent other such systems such as in FIG. 2, the present invention further provides a procedure to accommodate the system switching situation to minimize the amount of coordination required between the various systems. To this end, properly coordinated adjacent systems are arranged to share identical CLI codes on at least some of their bordering cells. If a mobile unit crosses into a new system having the same CLI, no registration is necessary since the former system is able to indirectly locate the mobile in the other system by communicating therewith. However, to minimize the coordination between systems, the mobile automatically registers with the new system if it enters a second cell of the new system. In this manner, only the CLIs of the border cells need to be coordinated and reserved, and adjacent systems are otherwise free to distribute their CLIs as desired.

To accomplish the system switching, since as previously mentioned, the system identifier (SI) is broadcast along with the CLI number for a cell, the current SI is similarly stored ($SI_{(s)}$) and compared against any subsequently received SIs ($SI_{(r)}$) to determine if the system has changed. Additionally, the mobile unit 20 stores the SI of the system that originally provided the virtual location information ($SI_{(list)}$).

Thus, as shown in FIGS. 12 and 13, if at step 104 the SI received does not equal the SI stored, then the mobile unit 20 will overwrite at step 106 the stored SI for the former current cell ($SI_{(s)}$) with the received SI ($SI_{(r)}$) for the new cell before looping back to step 100. As described above, no registration takes place, since this is the first cell of the new system that has been entered. Nevertheless, the MSC is aware that the mobile unit might be in a cell of the new system sharing a similar CLI number as previously coordinated.

Once another cell is entered, if the received SI again equals the stored SI ($SI_{(s)}=SI_{(r)}$), then the system further checks (at step 108) to determine if the newly received SI equals the SI of the cell that originally provided the CLI list ($SI_{(r)}=SI_{(l)}$). This occurs when the mobile unit reenters the system it is still registered in, for example, by turning around. If at step 108 the received SI equals the SI of the cell that provided the CLI list, then no further action is necessary, since the mobile unit 20 is already appropriately registered. However, if they are not equal, the mobile unit re-registers with the new cell as described above, regardless of the CLI number received, and receives a new CLI list (at step 110) for the new system. In this manner, the amount of coordination between adjacent systems is minimized since even if the second cell entered in the different system has the same CLI number as one of the numbers on the stored CLI list, the mobile station 20 re-registers upon entering the second cell of the new system.

Whenever a mobile unit registers in a system, the system determines at step 128 if the mobile unit belongs to that system, i.e., it checks to see if the mobile is in its "home" system. If so, nothing further needs to be done for that mobile, as it has already registered its location within in a cell and has received the proper CLI list. If however, the mobile unit does not belong, the "foreign" MSC determines at step 130 if this is the first time that the mobile unit has registered within its system. If this is the first time, then the foreign MSC notifies at step 132 the home system of the presence of the mobile unit therein. If not, the foreign MSC takes no action since the notification has been previously performed after the initial registration.

Within the same system, it can be readily appreciated that the various subset groups corresponding to each cell can be realigned by the MSC according to system needs. This can be accomplished in a simple manner by having the MSC change the subset groupings by changing the list and/or the identities of the CLI numbers corresponding to the cells. For example, by altering the groupings, a line of cells along an expressway can be grouped together at rush hour to minimize registrations, and restored at non-peak hours to a pattern wherein all or most of the cells adjacent the cell wherein registration occurs are grouped together. Likewise, smaller cells such as in a downtown area may be grouped together a first way during working hours and then grouped differently during commuting or weekend hours. By analyzing the amount of communication traffic on the system either dynamically or historically, the system is able to determine if there is an imbalance between messages from the system to the mobiles and messages from the mobiles to the system on the control channels, and take appropriate action by realigning the subset cell groupings to optimize system performance.

For example, the system can reduce the number of messages transmitted to the mobile units from any cell's control channel by reducing the number of location areas that include that cell. As a tradeoff, this increases the number of messages to the system on that cell since more mobile units will need to re-register upon entering that cell, as it will be stored in fewer of the CLI lists stored in the numerous mobile units' memories.

Moreover, it is also feasible to define a subset grouping location area based on the characteristics of the type of the mobile unit itself, such as the type of equipment including how much power it has or its modulation. The system can also allocate a virtual location area stored for each particular mobile unit based on its type of subscription or its movement history. If such an arrangement is desired, these parameters are also stored in the MSC memory 16 in conjunction with the mobile unit identification to make the virtual location determination.

Finally, it is feasible to develop a set of standards according to the invention wherein the mobile units themselves contain a predetermined limited number of virtual location subset groupings in their memories. When considered together for all of the cells in a system, the individual subset groupings constitute a predetermined pattern of the subset cells, i.e., a comprehensive listing of the subset cell arrangement for each cell of the system. In this embodiment, both the MSC and the mobile unit have one or more of these predetermined patterns of subset information stored therein.

Thus, if the RBS broadcasts a code number informing the mobile unit that a certain standard grouping is being used, the mobile unit will not need to receive the subset information through its transceiver, but instead has access to the information through a previously written non-volatile memory or the like. In this manner, only the current cell identifier needs to be broadcast, since both the MSC and the mobile station would be aware of the standard pattern and know the standard subset cell grouping (such as the CLI list) for each cell. Of course, instead of being previously written, the memory could be initialized with the values of the patterns as part of its power-up procedure, although to do so would require a substantial amount of data transmission.

Indeed, multiple standard patterns may be stored, although a code or the like identifying which of the standard patterns is currently in use by the system must be broadcast to the mobile unit. In this embodiment, each cell of the system broadcasts its "A" identity, a code identifying which standard pattern is being used (such as standard pattern "001"), its individual cell number, and if so organized, its CLI number. It can be appreciated that although a standardized system utilizing CLI numbers as described previously will function equivalently, for simplicity the standardized system described herein refers to cell numbers $C_1$–$C_{34}$ directly.

Figure 14C:
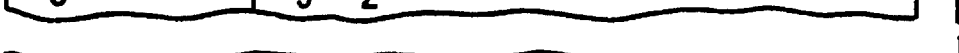
Figure 15A:
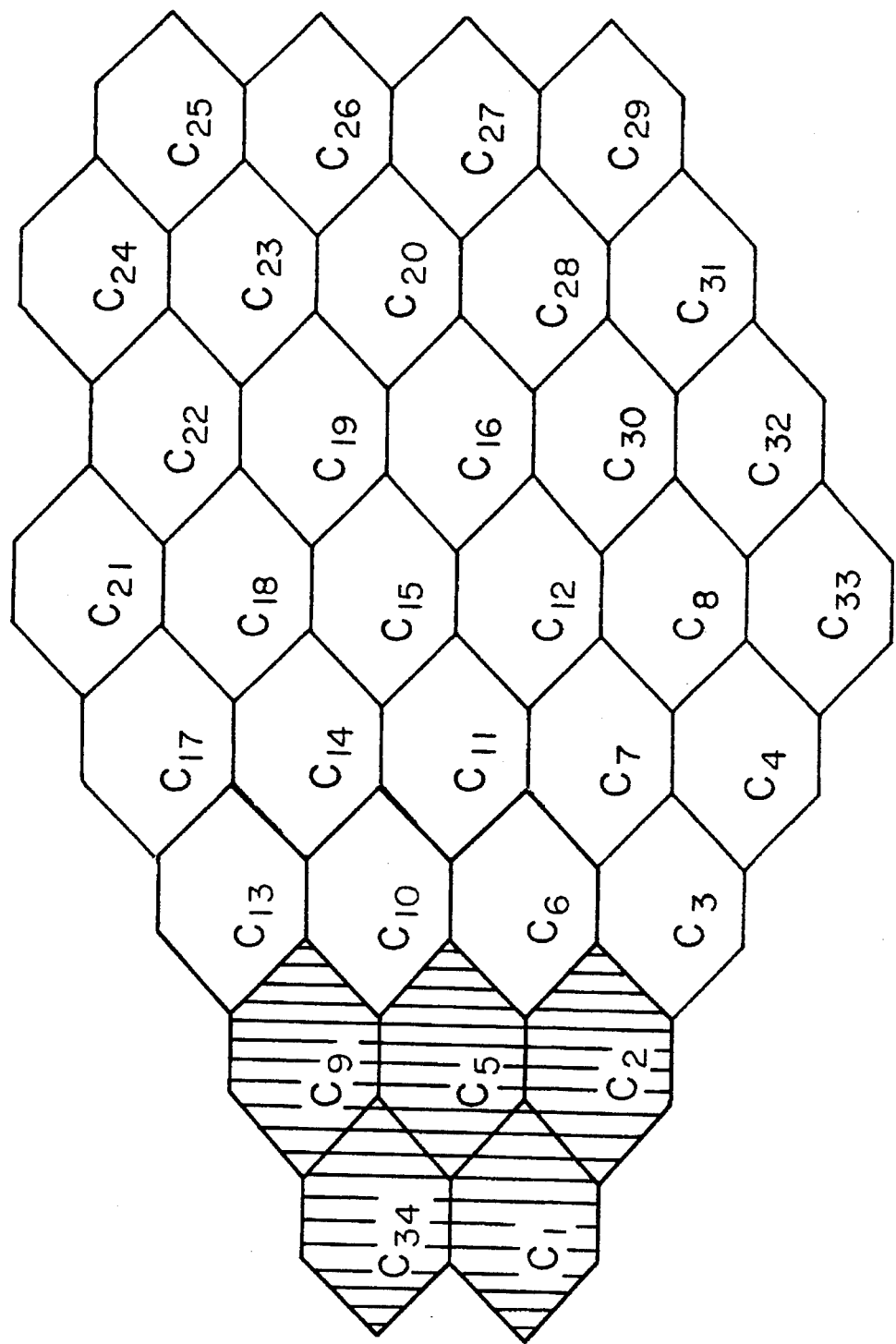
FIGS. 15a–15c are representations of a cellular system corresponding to FIGS. 14a–14c illustrating standardized virtual locations for one of the cells of a system.

Thus, as shown in FIGS. 14a and 15a, if the mobile unit 20 initially powers-up in cell $C_5$, upon receiving the system, current cell and pattern information and registering with the system, the mobile unit has stored in a non-volatile subset memory 26b that for cell $C_5$, when standard pattern "001" is in effect, cells $C_1$, $C_2$, $C_6$, $C_9$, $C_{10}$ and $C_{34}$ automatically belong in the subset of cells defining the location area. Of course, it is understood that cell $C_5$ is also in the group, however to preserve memory it is unnecessarily repetitive to store it again. Since pattern "001" is a standard pattern, the MSC 12, which is responsible for selecting the pattern in use, is likewise aware of the grouped virtual location area, for example by incorporating memory map 26b into a reserved section of its memory 16.

Although the RBS does not therefore transmit the virtual location areas to the mobile unit 20, the concept is substantially identical to the broadcasting of the VMLAs in that the mobile unit 20 only registers its location with a new cell when the mobile unit 20 leaves the VMLA established during the previous registration. At that time, the cell identification that is being broadcast will not match its VMLA list, causing the registration procedure to occur as previously described.

It can be readily appreciated that such standards may easily be developed despite the numerous differences in system sizes and shapes since mobile units in systems having fewer cells will never receive cell number identities in excess of the cells in that system. For example, even if standard "001" has groupings defined for hundreds of cells, it will still function since on smaller systems (such as the thirty-four cell system of the exemplified embodiment) since these systems will never broadcast a cell identity above thirty-four.

Figure 15B:
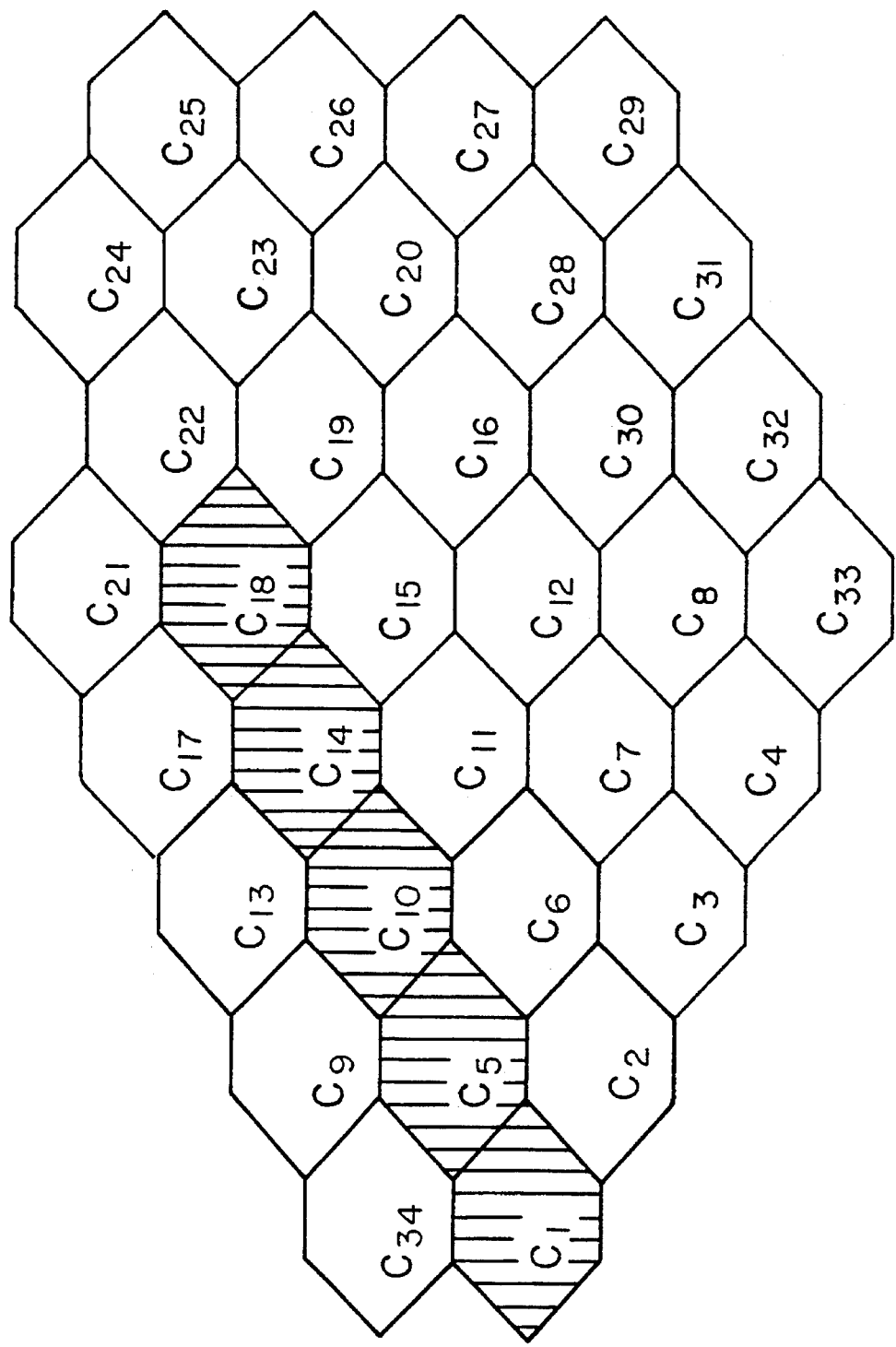

By changing the standard code and broadcasting a new code to the mobile units, the mobile units are able to internally adjust their subset list based upon their current cell. Moreover, by providing a certain standard code (or by not providing any standard code at all) the system would still be able to alternatively function by broadcasting the CLI information for each cell as described above. Thus, as shown in FIGS. 14b and 15b, if the MSC 12 notifies the RBSs $R_1$–$R_{34}$ that the standard has changed to a 002, the broadcasting of the new standard immediately notifies the mobile unit 20 in cell $C_5$ that along with cell $C_5$, cells $C_1$, $C_{10}$, $C_{14}$ and $C_{18}$ are in its virtual location area. If the mobile has moved to a cell that was previously in the VMLA but is no longer as a result of the change, (such as cell $C_2$), the mobile unit 20 re-registers as described previously so that it is not lost to the system.

Figure 15C:
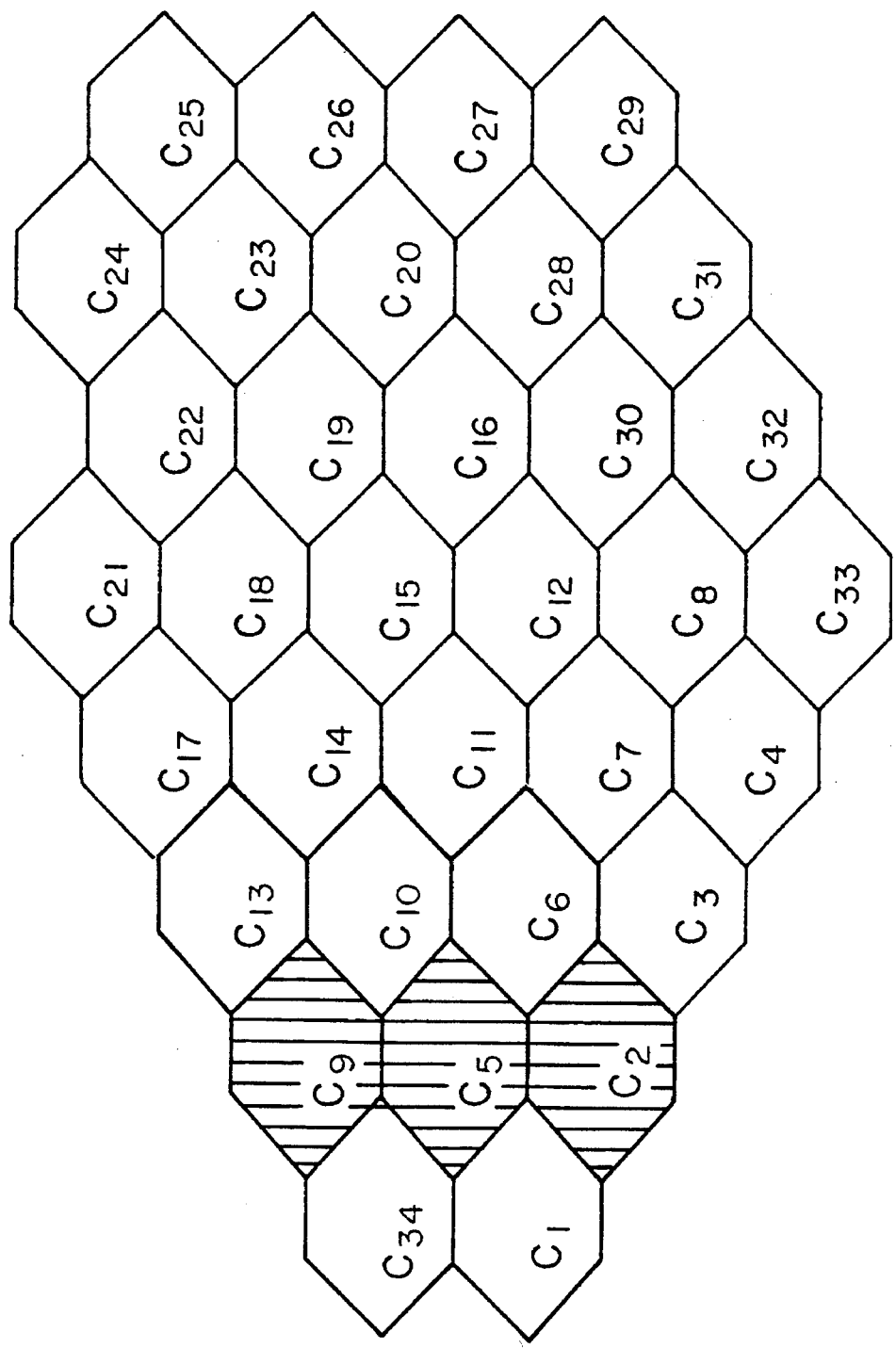

As shown in the vertical grouping arrangement of FIGS. 14c and 15c, numerous standardized VMLA patterns can be organized and pre-loaded into the memories of mobile units.

As can be seen from the foregoing description, there is provided a method and system for reducing system overhead by locating mobile units within a dynamic subset of cells. The amount of paging is balanced against the number of registrations necessary to locate the mobile unit. The method and system locates mobile units within a virtual subset of cells that varies dynamically according to the current location of the mobile unit during registration, which may be dynamically broadcast or previously standardized. Each mobile unit has its own virtual location in a subset of cells of the system determined by its current location.

Further, a method and system are provided wherein the system realigns the subset of cells corresponding to each cell to optimize system needs. The method and system facilitates location reporting as mobiles travel between different systems, yet minimizes the coordination required between different systems of cells when locating mobile units in one of the systems.

What is claimed is:

1. In a cellular radio transmission system having a plurality of radio base stations in communication with a centralized mobile switching center (MSC), each radio base station (RBS) defining a cell of the system, a method of locating a mobile unit within a dynamic subset of all of the cells of the system, the method comprising the steps of:

accumulating at the MSC historical information on registration locations of the mobile unit;

determining from the historical information at the MSC a customized group of cell identifiers for the mobile unit corresponding to a local one of the cells that is the cell within which the mobile unit is located;

transmitting information in each of the cells including a cell identifier associated with the local cell;

receiving the transmitted cell identifier at the mobile unit from the local cell;

comparing the received cell identifier with a group of cell identifiers stored in a memory of the mobile unit to determine if the cell identifier of the local cell matches one of the cell identifiers in the stored group; and executing the following steps if the cell identifier of the local cell does not match one of the cell identifiers in the stored group:

(1) transmitting information from the mobile unit to the RBS of the local cell that identifies and reports the presence of the mobile unit within the local cell;

(2) communicating information from the RBS of the local cell to the MSC that locates the mobile unit within the local cell;

(3) communicating information representing the customized group of cell identifiers from the MSC to the local cell;

(4) communicating from the RBS to the mobile unit information representing the customized group of cell identifiers for the mobile unit; and (5) updating the memory of the mobile unit with a new group of cell identifiers corresponding to the customized group of cell identifiers.

2. The method of claim 1 wherein the step of determining the customized group of cell identifiers comprises the step of including at least one cell adjacent the local cell in the customized group.

3. The method of claim 1 further comprising the step of storing the identity of the mobile unit in conjunction with the information representing a customized group of cell identifiers transmitted to the mobile unit in a MSC memory connected to the mobile switching center.

4. The method of claim 3 further comprising the step of locating a mobile unit within the system by 1) recalling from the MSC memory the information representing a customized group of cell identifiers transmitted to the mobile unit and 2) initially controlling only the radio base stations defining those cells associated with the cell identifiers in the customized group to attempt to communicate with the mobile unit.

5. The method of claim 3 further comprising the step of clearing the information representing the customized group of cell identifiers stored in conjunction with the identity of the mobile unit from the mobile switching center memory in a predetermined manner.

6. The method of claim 5 wherein the information representing the customized group of cell identifiers is cleared from the MSC memory after a predetermined amount of time.

7. The method of claim 3 wherein the identity of the mobile unit is cleared from the MSC memory after a predetermined amount of time after the last communication with the mobile unit.

8. The method of claim 1 further comprising the step of clearing the stored group of cell identifiers from the mobile unit memory in a predetermined manner.

9. The method of claim 8 wherein the stored group of cell identifiers is cleared from the mobile unit memory each time the mobile unit is powered-up.

10. The method of claim 8 wherein the stored group of cell identifiers is cleared from the mobile unit memory each time the mobile unit is powered-down.

11. The method of claim 1 further comprising the step of assigning the same cell identifier to a plurality of cells in the system.

12. The method of claim 1 further comprising the step of storing in a memory of the mobile unit and a memory of the MSC at least one predetermined group of cell identifiers, and wherein the step of communicating to the mobile unit information representing the customized group of cell identifiers comprises the step of communicating a code from the MSC to the mobile unit, the code instructing the mobile unit to update the mobile unit memory with the predetermined group as the new group of cell identifiers corresponding to the customized group of cell identifiers.

13. The method of claim 12 wherein the memory of the mobile unit and the memory of the MSC have stored therein a plurality of predetermined groups of cell identifiers, further comprising the step of selecting at the MSC one of the groups as the customized group, communicating a selection code corresponding to the customized group from the MSC to the local RBS, and wherein the step of communicating to the mobile unit information representing the customized group of cell identifiers comprises the step of transmitting the selection code from the local RBS to the mobile unit, the mobile unit selecting from its memory the predetermined group that corresponds to the selection code to update its memory with the customized group as the new group.

14. The method of claim 1 wherein the group of cell identifiers is cleared from the mobile unit memory after a predetermined amount of time.

15. The method of claim 1 further comprising the steps of determining at the MSC at least one other customized group corresponding to the local cell, and selectively varying which customized group of cell identifiers is communicated to the local cell.

16. The method of claim 15 wherein the customized group of cell identifiers is selectively varied in dependence on anticipated usage.

17. The method of claim 15 wherein the determined group of cell identifiers is selectively varied in dependence on the type of the mobile unit.

18. The method of claim 15 wherein the determined group of cell identifiers is selectively varied in dependence on a service subscription corresponding to the mobile unit.

19. A mobile radio transmission system having a mobile switching center (MSC) connected to a plurality of distributed radio base stations, each radio base station (RBS) defining a cell of the system, for communicating with mobile units within the cells, the system comprising:

means including a memory at the MSC for accumulating historical information on registration locations of the mobile unit and for determining from the historical information a customized group of cell identifiers for the mobile unit corresponding to a local one of the cells that is the cell within which the mobile unit is located;

means at the MSC for communicating information to each RBS in the system;

a transceiver at each RBS for transmitting information including a cell identifier associated with the cell defined by each RBS;

at least one mobile unit including a transceiver for transmitting information therefrom and receiving the information transmitted by the RBS of the local cell, a memory for containing a group of cell identifiers, a processor for comparing the local cell identifier with the group of cell identifiers from the mobile unit memory; and circuitry responsive to the comparison by the processor for:

(1) informing the RBS of the local cell that the mobile unit is within the cell, (2) receiving at the mobile unit information representing the customized group of cell identifiers; and (3) updating the mobile unit memory with a new group of cell identifiers corresponding to the customized group of cell identifiers;

if the local cell identifier does not match one of the identifiers in the group of cell identifiers stored in the mobile unit memory.

20. The system of claim 19 further comprising circuitry at the radio base station for transferring the received mobile unit information to the mobile switching center.

21. The system of claim 20 wherein the MSC memory stores the customized group of cell identifiers transmitted to the mobile unit in conjunction with the mobile unit identity.

22. The system of claim 21 further comprising means at the mobile switching center for receiving a telephone call requesting connection to a mobile unit, processing circuitry at the mobile switching center for retrieving from the MSC memory the customized group of cell identifiers stored in conjunction with the identity of the called mobile unit, and circuitry for communicating the request to the radio base stations associated with the customized group of cell identifiers.

23. The system of claim 20 wherein the mobile unit includes a memory and the MSC includes a memory, and the mobile unit memory and the MSC memory contain data representing at least one predetermined group of cell identifiers.

24. The system of claim 23 wherein the MSC memory and the mobile unit memory contain data representing a plurality of predetermined patterns of groups of identifiers, and each radio base station includes a system controller and a modem therein, the MSC includes processing circuitry and a modem therein, and the MSC processing circuitry determines which pattern of group identifiers is in operation and communicates a pattern identifier to each radio base station corresponding thereto such that the system controller therein controls the RBS transceiver to transmit the pattern identifier to the transceiver at the mobile unit.

25. The system of claim 19 wherein each radio base station includes a system controller, and the system controller at each radio base station controls the transceiver therein to transmit the customized group of cell identifiers to the transceiver at the mobile unit.

26. The system of claim 25 wherein the MSC includes processing circuitry and a first modem, the RBS includes a second modem connected to the first modem at the MSC, and the MSC controls the first modem therein to transfer information including the cell identifier of the RBS to the second modem at the RBS.

27. The system of claim 26 wherein the MSC processing circuitry determines the group of cell identifiers sent to a mobile unit based on the cell location of the mobile unit and the equipment type of the mobile unit as recorded in the MSC memory.

28. The system in claim 26 wherein the MSC processing circuitry determines the group of cell identifiers sent to a mobile unit in a cell based on the cell location of the mobile unit and the service subscription of the mobile unit as recorded in the MSC memory.

29. The system of claim 26 wherein the MSC processing circuitry assigns each cell of the system the identifier associated therewith.

30. The system of claim 26 wherein each RBS includes a memory, and the MSC processing circuitry communicates to each RBS the customized group of cell identifiers for storage in the RBS memory and retrieval therefrom for transmission to the mobile unit.

31. The system of claim 26 wherein the MSC processing circuitry further communicates system identifying information to each RBS connected thereto for transmission to the mobile unit, the mobile unit transceiver receives the system identifying information and the mobile unit processor stores it in the mobile unit memory in conjunction with the identifier received from the local cell.

32. In a plurality of cellular radio transmission system, each system having a plurality of radio base stations in communication with a centralized mobile switching center (MSC), each radio base station (RBS) defining a cell, a method of locating a mobile unit within a dynamic subset of all of the cells of the systems, the method comprising the steps of:

transmitting information in each of the cells including a cell identifier associated with the cell and a system identifier associated with the cell;

receiving a transmitted cell identifier and a system identifier at the mobile unit from a first cell within which the mobile unit is located;

storing the system identifier of the first cell in a memory of the mobile unit;

locating the mobile unit within a second cell;

receiving a transmitted cell identifier and a system identifier at the mobile unit from the second cell;

comparing the cell identifier of the second cell with a group of cell identifiers stored in the memory of the mobile unit to determine if the cell identifier of the second cell matches one of the cell identifiers in the stored group; and executing the following steps if the cell identifier of the second cell does not match one of the cell identifiers in the stored group:
  (1) transmitting information from the mobile unit to the RBS of the second cell that identifies and reports the presence of the mobile unit within the second cell;
  (2) communicating information from the RBS of the second cell to the MSC that locates the mobile unit within the second cell;
  (3) communicating to the mobile unit information representing a new group of cell identifiers;
  (4) updating the memory of the mobile unit with the new group of cell identifiers;
  (5) storing the system identifier of the second cell as a group system identifier in the memory of the mobile unit; or executing the following steps if the cell identifier of the second cell matches one of the cell identifiers in the stored group:
  comparing the system identifier of the second cell with the system identifier of the first cell and if there is not a match, comparing the system identifier of the second cell to a previously stored group system identifier, and if there is not a match:
  (1) transmitting information from the mobile unit to the RBS of the second cell that identifies and reports the presence of the mobile unit within the second cell; and
  (2) communicating information from the RBS of the second cell to the MSC of the system associated with the system identifier of the second cell, the information locating the mobile unit within that system and within the second cell.

33. In a cellular radio transmission system having a plurality of radio base stations in communication with a centralized mobile switching center (MSC), each radio base station (RBS) defining a cell of the system, a method of locating a mobile unit within a dynamic subset of all of the cells of the system, the method comprising the steps of:

accumulating at the MSC historical information on registration locations of the mobile unit;

determining from the historical information at the MSC a customized group of cell identifiers for the mobile unit corresponding to a local one of the cells that is the cell within which the mobile unit is located;

communicating information representing the customized group of cell identifiers from the MSC to the local cell;

transmitting information in each of the cells including a cell identifier associated with the local cell;

receiving the transmitted cell identifier at the mobile unit from the local cell;

comparing the received cell identifier with a group of cell identifiers stored in a memory of the mobile unit to determine if the cell identifier of the local cell matches one of the cell identifiers in the stored group; and executing the following steps if the cell identifier of the local cell does not match one of the cell identifiers in the group:
  (1) transmitting information from the mobile unit to the RBS of the local cell that identifies and reports the presence of the mobile unit within the local cell;
  (2) communicating information from the RBS of the local cell to the MSC that locates the mobile unit within the local cell;
  (3) communicating from the RBS to the mobile unit information representing the customized group of cell identifiers for the mobile unit; and
  (4) updating the memory of the mobile unit with a new group of cell identifiers corresponding to the customized group of cell identifiers.

34. The method of claim 33 wherein each RBS has a memory, further comprising the steps of loading from the MSC to the memory of the RBS that defines the local cell information representing the group of cell identifiers for the mobile unit, and retrieving the information from the RBS memory of the RBS that defines the local cell prior to the step of communicating information representing the customized group of cell identifiers to the mobile unit.

* * * * *